Figure 1:
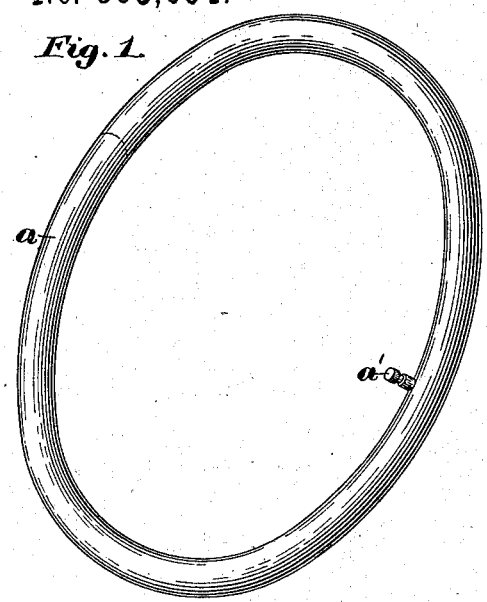

(No Model.)

R. COWEN.
PROCESS OF MANUFACTURING TIRES.

No. 565,854.  Patented Aug. 11, 1896.

Witnesses:
Walter E. Lombard.
Fred S. Greenleaf.

Inventor:
Robert Cowen,
by Crosby & Gregory
Attys.

UNITED STATES PATENT OFFICE.

ROBERT COWEN, OF CAMBRIDGE, MASSACHUSETTS, ASSIGNOR TO THE BOSTON WOVEN HOSE AND RUBBER COMPANY, OF BOSTON, MASSACHUSETTS.

PROCESS OF MANUFACTURING TIRES.

SPECIFICATION forming part of Letters Patent No. 565,854, dated August 11, 1896.

Application filed January 13, 1896. Serial No. 575,307. (No specimens.)

*To all whom it may concern:*

Be it known that I, ROBERT COWEN, of Cambridge, county of Middlesex, State of Massachusetts, have invented an Improvement in Processes of Manufacturing Pneumatic Tires, of which the following description, in connection with the accompanying drawings, is a specification, like letters on the drawings representing like parts.

This invention has for its object to provide a novel process for the manufacture of pneumatic tires.

Prior to my invention in the manufacture of pneumatic tires it has been common to build up the endless unvulcanized tube usually composed of alternate layers of rubber and fabric and to place this tube in a mold, inflate it within the mold, and while inflated vulcanize it. It has been found, however, that tires produced in this way are open to the objection that the tire-surface is smooth and in the line of tread has formed upon it a fin or crease in the line where the two parts of the mold come together, this fin or crease being in the line where the pressure is exerted upon the tire when in use, thereby rendering the tire unduly stiff. Such a tire is further open to the objection that it is difficult to obtain uniformity in product, and there is a large loss incurred in the manufacture because of pinched or otherwise injured or distorted tires.

To obviate these objections my present invention comprehends a method of making pneumatic tires wherein the same are first formed in an endless tube of or containing unvulcanized rubber, which is arranged upon a suitable form with its tread-surface temporarily covered by a suitable fabric, which is held or confined tightly upon the tube in suitable manner, as, for instance, by winding a strip of binding fabric spirally about the tube, its form, and tread-covering fabric, after which the covered and confined tire-tube is vulcanized in suitable manner. When the tread-covering material is removed, it is found that the threads composing the material have been impressed into the tread-surface of the tire, leaving a finely impressed or indented surface, sufficiently rough to prevent slipping of the tire in muddy weather without interfering with the free running of the tire.

In carrying out my invention I prefer that the tire-tube be more or less inflated, preferably above the atmospheric pressure, practically throughout the entire process, in order that the tire may be more readily handled without danger of twisting or distorting the same when in its pliable unvulcanized condition, in order that the same may be built up and finished in precisely the condition in which it is to be used, thereby avoiding any line or lines of weakness which are always caused by the inflation of the tire to a condition differing from that in which it was manufactured. This inflation is particularly desirable after the tire-tread has been covered with the covering fabric in order that the material of the tire-tube may be more distinctly impressed into the meshes of the covering fabric for the purpose stated.

A tire manufactured by my process has no creases or stiffening projections formed upon its tread-surface, as is the case where tires are formed in metallic molds.

Other features of my invention will be hereinafter described, and pointed out in the claims.

Figure 2:
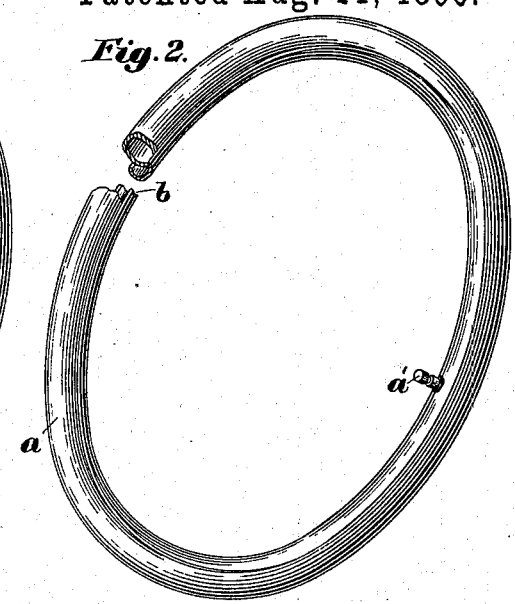
Figure 3:
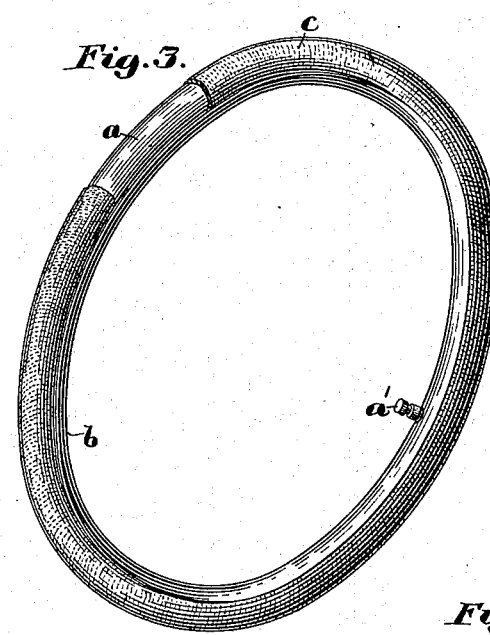
Figure 4:
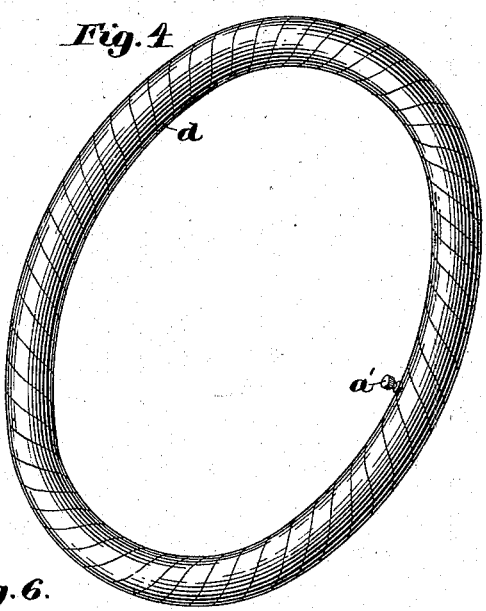
Figures 5, 6:
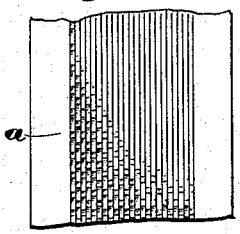

In the drawings, Figure 1 in perspective illustrates an endless tire-tube of or containing rubber. Fig. 2 shows the same applied to a suitable form preparatory to the vulcanization. Fig. 3 shows the tube mounted upon the form with its tread-surface covered with a suitable fabric, the latter being broken away to better show its arrangement upon the tube; Fig. 4, a similar view showing the tube secured to the form in an inflated condition by spirally-wrapped coverings in condition for vulcanizing, and Figs. 5 and 6 details respectively showing in section and in face view portions of the completed tire.

Referring to the drawings for illustration, I will now proceed to describe my invention as embodied in the best method now known to me for practicing the same, it being expressly understood, however, that my invention is not to be restricted to all or the particular steps described in the specification, but that my invention, as such, will be particularly set forth in the claims at the end of this specification.

In the drawings, Fig. 1 is an endless tire-tube built up or formed in usual or suitable manner, of alternate layers of rubber and a woven fabric, as canvas or duck, but the particular construction of this tube or the method of making it into endless or ring-like form is not material to this invention, so long as it contains to a greater or less extent rubber in a substantially-unvulcanized condition. This endless unvulcanized tube, which for convenience I shall hereinafter designate as a "rubber tube," notwithstanding it has incorporated in it a fabric, is next preferably sprung over and upon a ring-like form, preferably hollowed at its outer face, and shown at $b$, Fig. 2, the tube when first sprung upon this form usually assuming a flattened or collapsed condition on and following the surface of the form.

Through the usual valve-stem $a'$ and a suitable valve or plug with which the tire $a$ is provided before placing upon the form the tire-tube when on the form is preferably inflated, as shown in Fig. 2, preferably not quite to the extent to which it will be inflated when placed in the vulcanizing-chamber. While this inflation of the tire-tube is not absolutely essential, yet, for the best results, I prefer to so inflate the tube, as a great advantage arises therefrom, in that the tube thereby acquires sufficient stability to enable it to be handled in the subsequent process of wrapping, &c., to be described, without fear of twisting or distorting the tube. I next cover the outer or tread surface of the unvulcanized tube with a suitable fabric $c$, preferably of closely-woven or coarse duck, which, for convenience, may be wrapped circumferentially about the inflated unvulcanized tube, as best shown in Fig. 3, this fabric, for the best results, being stretched tightly about the tire-tube to impress its threads or surface to a sufficient degree into the soft unvulcanized rubber surface of the tire-tube and secured in place in suitable manner. This tread-covering fabric, however arranged upon the tube, is confined thereupon in suitable manner, preferably by binding the whole— viz., the form, the tire-tube, and its fabric covering—firmly together by spirally wrapping about the same, as indicated in Fig. 4, a strip or strips $d$ of cloth or other suitable fabric, after which the tire-tube is preferably again and further inflated to a pressure, say, of twenty to thirty pounds to more tightly press the tube against its covering fabric and further and more distinctly to impress the surface of the covering fabric into the tread of the tire. During the process of vulcanization the air already forced within the tube greatly expands by reason of its being heated, thereby tending to burst the tube, this tendency, particularly prior to complete vulcanization, being restricted only by the covering material or materials, and I have found in practice that this bursting tendency is best restricted, and in the most simple and effective manner, by the spiral wrappings of fabric described; and by means of this or equivalent means for confining the tread-covering fabric upon the tire-tube I am enabled to vulcanize the tire-tube while in an inflated condition, practically such as it is called upon to assume when in use upon the road. Thus inflated, covered, and wrapped, as in Fig. 4, the tube and its form are placed in a suitable vulcanizing-chamber and the tube vulcanized by a steam-bath, or the tube may be vulcanized in any other desired or well-known manner, after which the spiral wrappings and temporary tread-cover are removed, leaving the finished and completed tire to be removed from the form in the condition shown in Figs. 5 and 6.

From the foregoing description it will be understood wherein lie the advantages resulting from my novel method of construction.

My tire-tube is preferably vulcanized while inflated, and therefore naturally tends to remain in the very condition and form in which it must assume when inflated and in use. Hence there is no distortion or weakness caused by inflating the tube as necessarily results from the inflation of a tube vulcanized in a deflated condition, and, since my tire throughout the entire process of manufacture is maintained inflated, there can be no lines of weakness due to flattening or folding as when the tire is vulcanized in a deflated condition, and, again, the material or rubber of which my tire is composed, by the very necessities of the case, is uniformly distributed around or throughout the tire and is so maintained. By vulcanizing it when wrapped or covered with the fabric, as described, there can be no ridges or creases such as are formed by the use of a vulcanizing-mold, and the tread-surface of the tire-tube is left finely impressed, which, so far as I am aware, is entirely new with me and produces a tire which has a surface of sufficient roughness to prevent slip in muddy weather without, to any appreciable extent, interfering with the free running of the tire.

My invention is not necessarily limited to the particular number or character of steps herein enumerated, for it is evident that the details may be varied in many ways without departing from the essence of my invention, which lies in covering the tread-surface of the inflated unvulcanized tube with the fabric and vulcanizing the covered tube while inflated.

The tire herein described is not herein claimed, and the right to secure Letters Patent thereon is reserved, as said tire forms the subject-matter of another application filed by me June 12, 1896, Serial No. 595,272, which forms a division of the present application.

Having described my invention, and without limiting myself as to details, what I claim, and desire to secure by Letters Patent, is—

1. The herein-described method of manufacturing pneumatic tires, which consists in building up an endless tube of or containing unvulcanized rubber; temporarily covering the tread-surface of the inflated unvulcanized tube with a fabric adapted to make fine indentations therein; securing the said tread-covering fabric temporarily in position pressing upon the said tube; vulcanizing the tube while so covered, and then removing the temporary covering to leave the completed vulcanized tube ready for use, substantially as described.

2. The described method of manufacturing pneumatic tires, which consists in building up an endless tube of or containing unvulcanized rubber; arranging the same upon a form; temporarily covering the said tire with a fabric adapted to make fine indentations therein; temporarily securing the latter in position pressing upon the tube on the form; vulcanizing the covered tube while on its said form; removing the temporary covering fabric from the tire and removing the tire from the form, substantially as described.

3. The improved method of manufacturing pneumatic tires, which consists in building up an endless tube of or containing rubber, inflating the same; temporarily covering the tread-surface of the inflated vulcanized tube with a fabric adapted to make fine indentations therein; confining the said covering fabric in position pressed upon the inflated tube; vulcanizing the temporarily covered and confined tube while inflated, and removing the said temporary covering to leave the finished tire, substantially as described.

4. The herein-described method of manufacturing pneumatic tires, which consists in building up an endless tube of or containing unvulcanized rubber, covering the tread-surface of the unvulcanized tube with a fabric adapted to make fine indentations therein, temporarily securing the said tread-covering fabric to impress the latter into and to form indentations in the former, vulcanizing the tube while so covered and inflated, then removing the temporary covering to leave the complete vulcanized tube ready for use, substantially as described.

In testimony whereof I have signed my name to this specification in the presence of two subscribing witnesses.

ROBERT COWEN.

Witnesses:
   J. O. DE WOLF,
   J. W. FELLOWS.